(12) United States Patent (10) Patent No.: US 6,547,058 B2
Ouellette (45) Date of Patent: Apr. 15, 2003

(54) CONVEYOR ROW FORMER, ARRAY RAKE AND SWEEP MECHANISM FOR CONVEYING OBJECTS HAVING TRIANGULAR CROSS SECTIONS

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 09/862,047

(22) Filed: May 21, 2001

(65) Prior Publication Data

US 2002/0175046 A1 Nov. 28, 2002

(51) Int. Cl.[7] ............................................. B65G 47/26
(52) U.S. Cl. ..................... 198/432; 198/430; 198/418.5
(58) Field of Search ............................... 198/418.5, 426, 198/429, 430, 432, 433

(56) References Cited

U.S. PATENT DOCUMENTS

| | | | | | |
|---|---|---|---|---|---|
| 3,724,639 A | * | 4/1973 | Hara | ........................... | 198/430 |
| 3,990,566 A | * | 11/1976 | Nordqvist | ................ | 198/418.5 |
| 4,132,305 A | * | 1/1979 | Mastak | ........................ | 198/432 |
| 5,244,330 A | * | 9/1993 | Tonjes | ..................... | 198/432 X |
| 5,368,151 A | * | 11/1994 | Klenk | ......................... | 198/426 |

* cited by examiner

Primary Examiner—James R. Bidwell
(74) Attorney, Agent, or Firm—Thompson Coburn LLP

(57) ABSTRACT

A conveyor system comprises a novel row former, a novel array rake and a novel sweep mechanism that are all designed to prevent relative movement between objects arranged in rows and then formed in two dimensional arrays of the objects as the objects are moved through the conveyor system, where the objects have triangular shaped cross sections.

28 Claims, 10 Drawing Sheets

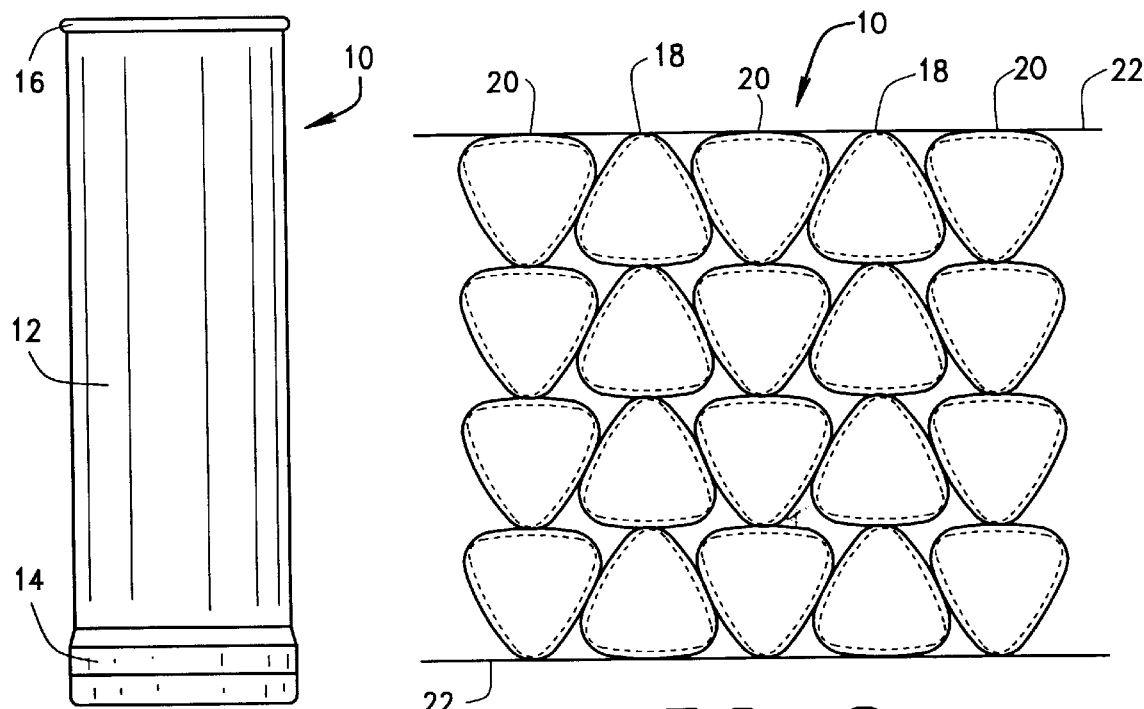
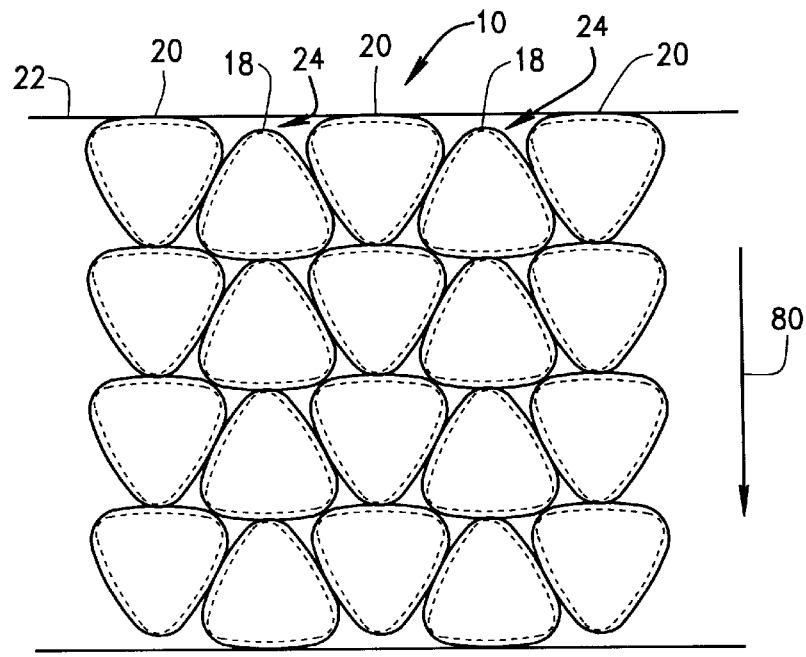

CONVEYOR ROW FORMER, ARRAY RAKE AND SWEEP MECHANISM FOR CONVEYING OBJECTS HAVING TRIANGULAR CROSS SECTIONS

This application is related to application Ser. No. 09/861,827, filed May 21, 2001 which is presently pending and is incorporated herein by reference.

BACKGROUND OF THE INVENTION

1. Field of the Invention

The present invention pertains to a conveyor system comprising a row former, an array rake and a palletizing sweep mechanism that are arranged in series and are specifically designed to convey objects having irregular cross section shapes. In particular, the present invention pertains to a conveyor system comprising a novel row former, a novel array rake and a novel sweep mechanism that are all designed to prevent relative movement between objects arranged in rows and then formed in two dimensional arrays of the objects as the objects are moved through the conveyor system, where the objects have triangular shaped cross sections.

2. Description of the Related Art

Conveying systems for conveying objects, for example light-weight blow molded plastic bottles, typically include portions of the conveying system that quickly convey one or more single file streams of the objects from one station of the conveying system to another station, for example from a blow molding station where the plastic bottles are formed to a downstream palletizing station where the blow molded plastic bottles are arranged on pallets. Conveying systems often include infeed conveyors that convey one or more single file streams of the objects to a row former. The row former includes pairs of spaced, parallel arms or bars that define a row forming slot between each pair arms for each stream of objects conveyed by the infeed conveyor. The arms are positioned above the infeed conveyor where the slots between the arms receive a number of objects from the streams of objects conveyed by the infeed conveyor and arrange the numbers of objects in rows. With the desired number of objects filling the slots of the row former, the conveyed streams of objects are held back by gates of the infeed conveyor. The row former, with the arranged rows of objects, then moves in a direction perpendicular to the rows of objects across the infeed conveyor and onto the accumulating table surface. The arms of the row former then stop and move upwardly from the accumulating table surface, leaving the numbers of objects in the first arranged rows on the accumulating table surface.

The row former is then moved in the opposite direction back across the accumulating table surface to its position in line with the infeed conveyor. The row former is then moved downwardly aligning the slots between the pairs of arms of the row former with the streams of objects held back on the infeed conveyor. The gates of the infeed conveyor are opened and the slots between the arms of the row former are again filled with numbers of objects conveyed by the conveyor, upon which the gates of the conveyor are closed. The movement of the row former described above is then repeated, leaving numbers of objects in the second arranged rows on the accumulating table surface. This movement of the row former is repeated in forming two dimensional arrays of the objects on the accumulating table surface.

The accumulating table typically includes an array rake that moves across the surface of the table, engaging with the formed array of objects and pushing the formed array of objects over the table surface in the conveyor path direction toward a palletizer. The array rake is typically an elongated bar that extends across the surface of the accumulating table in a direction perpendicular to the conveyed path direction. The rake is moved by chain conveyors that cause the rake to travel across the accumulator table surface, pushing a formed array of objects before the rake across the table surface. When the rake has completed its movement across the table surface, the chain conveyor then moves the rake through its return cycle beneath the table surface before returning the rake to the accumulator table surface to engage with and push the next array of objects formed on the table surface by the row former. The accumulator rake is often used to move a formed array of objects over the accumulator table surface to a position where a sweep mechanism of a palletizer can be clamped over the formed array of objects.

The sweep mechanism of the palletizer is comprised of four panels arranged in a rectangular configuration that are positioned over the formed array of objects on the accumulating table surface. The four panels are moved downwardly over the array and pivot toward each other to clamp around the array of objects formed on the table surface. The sweep mechanism then moves the formed array of objects over the accumulating table surface as a layer of objects to be stacked on a pallet by a palletizer.

Prior art row formers, accumulating table rakes and sweep mechanisms have worked well in arranging numbers of conveyed objects in rows and then positioning the rows side-by-side in forming two dimensional arrays of the objects, and then sweeping the arrays of objects as layers of objects to be palletized where the objects being formed into the arrays are symmetric about their center vertical axes. Plastic blow molded bottles and other such containers that are symmetric about their center vertical axes are examples of such objects. With each of the individual objects in an arranged row being symmetric about its center vertical axis, it did not matter if the object was rotated or caused to move slightly about its center axis as the row former pushed the rows of objects across the infeed conveyor and onto the row accumulating table surface, or as the arrays of objects were moved across the accumulating table surface by the rake or sweep mechanism because the relative orientations of the objects would remain unchanged. However, difficulties were encountered in arranging rows of objects and in forming the rows of objects into two dimensional arrays of the objects when the shapes of the objects changed from the conventional shape, symmetric about its center axis, to asymmetric shapes, for example a plastic, aluminum or cardboard container having a triangular cross section.

A side view of one example of a container 10 having a triangular cross section is shown in FIG. 1. The container is basically comprised of a hollow triangular body 12 having an enlarged base 14 at its bottom and an enlarged rim 16 around a top opening of the container. In forming rows of these containers 10, single file streams of these containers would be supplied to the slots between the row former arms with the containers of each stream of containers being positioned relative to each other as shown in the schematic representations of the positions of the containers in FIG. 2. FIG. 2 shows the relative positions of the containers in four streams of containers supplied by the infeed conveyor to the four slots of a row former. As seen in FIG. 2, adjacent containers of each of the four rows of containers are rotated 180 degrees relative to each other to maximize the number of containers that can be arranged in each row of the row former. However, although the arrangements of the containers in each row shown in FIG. 2 maximizes the numbers of containers occupying each row of the row former, problems arose when the rows of containers were moved from the row former onto the accumulating table surface of the conveyor system and the arms of the row former were removed from between the rows of the containers.

When the rows of containers formed by the row former and moved to the accumulating table surface in two dimensional arrays such as that shown in FIG. 2 were pushed across the accumulating table surface by the forward arm of the row former, or by subsequent rows of containers formed by the row former, or by the array rake of the accumulating table, the point contact between the apexes 18 of the containers in one row with the side walls 20 of the containers in an adjacent row would cause containers to move away from the relative positions shown in FIG. 2. This was primarily due to the instability caused by the single point contact of the apex 18 of each container in one row pushing against or being pushed by the middle of a side wall 20 of a container in an adjacent row. The single point contact of the apex 18 with the side wall 20 would cause the containers in one row being pushed by the containers in an adjacent row to tend to rotate or move to one side or the other of their apexes as the containers are pushed across the accumulating table surface.

To overcome the problem of movement of the triangular shaped containers relative to each other as an array of the containers is pushed across the accumulating table surface by the row former, by subsequently formed rows of containers or by the accumulating table rake, the inventor of the subject matter of the application created a novel arrangement of the triangular containers. In the novel arrangement, the containers of a two dimensional array are not arranged in rows that extend straight across the array with the side wall and apexes of adjacent containers in each row being positioned in a single vertical plane 22 as shown in FIG. 2, but the containers of each row are arranged in a staggered arrangement shown in FIG. 3. In the staggered arrangement, the apexes 18 of the containers in each row are spaced by a gap 24 from the vertical plane 22 in which the side walls 20 of the container in the row are positioned. The staggered arrangement of containers shown in FIG. 3 provides a more stable two dimensional array of containers than that of the array of FIG. 2. In the staggered array of FIG. 3, the side walls 20 of the containers in each row pushed by an apex 18 of a container in the adjacent row are also contacted at opposite ends of the pushed side walls by the two pushing containers on opposite sides of the pushing container making apex contact. Also, the side wall 20 of each pushing container in one row that pushes against an apex 18 of a pushed container in an adjacent row also pushes against the two pushed containers on opposite sides of the pushed container with which it makes apex contact. Thus, the additional points of contact between the containers in adjacent rows prevents the pushed containers from rotating to either side and provides a more stable two dimensional array of containers pushed across the accumulating table surface that maintains the relative positions of the containers as they are pushed across the table surface.

However, the array arrangement of containers shown in FIG. 3 presents the problem of how to establish the staggered relationship between the containers 10 in each row formed across the array and how to maintain the staggered array of containers as the array is pushed across the accumulating table surface and swept from the table surface as a layer to be stacked on a pallet by a palletizer.

SUMMARY OF THE INVENTION

The present invention overcome the instability problem of the two dimensional array of triangular shaped containers shown in FIG. 2 by providing a row former that creates the staggered rows of containers shown in the array of FIG. 3, and an accumulating table array rake and a sweep mechanism that maintain the staggered relationship of the containers in the two dimensional array formed and moved across the accumulating table surface of the conveyor system.

The row former of the present invention is similar to prior art row formers but includes several novel additional features. The pairs of row former arms that define the infeed slots of the row former are spaced apart a distance that is slightly larger than the width dimension of the triangular container 10 measured between the apex 18 and side wall 20 of the container. With this spacing between each pair of row former arms, the side walls of adjacent containers formed in a row between each pair of arms engage against one of the arms of the pair and the apexes of adjacent containers are spaced by the predetermined gap 24 from the other arm of the pair, thereby creating the staggered configuration of the containers in the rows. In addition, angled brackets are positioned at the far ends of the slots between the row former arms opposite the openings of the slots. The angled brackets engage against the side walls of the containers at the far ends of the rows of containers formed in the slots to properly orient the containers at the far ends of the slots. By properly orienting the containers at the far ends of the slots, the brackets also orient the subsequent containers conveyed into the slots in forming the staggered rows of containers. In addition, a row retaining gate is provided on at least one of each of the pairs of row former arms adjacent the slot openings at the near ends of the slots. The gate is opened to provide clear access into the slot for the row of containers conveyed to the row former. When the row retaining gate is closed it is positioned in the slot at an angle corresponding to the angles of the side walls of the containers where the gate engages a side wall of an end container of the formed row at the near end of the slot. The engagement of the angled row retainer gate with the end container side wall retains the end container at the slot opening as well as the other containers of the row formed in the slot maintaining the staggered configuration of the containers in the row and holding the containers in their staggered configuration as the row former is moved from the infeed conveyor to the accumulating table surface.

To maintain the staggered arrangements of the rows of containers in the array after they have been pushed onto the accumulating table surface and the row former has been removed, the accumulating table surface has side guide rails that prevent the staggered rows of containers from spreading out and the forwardmost arm of the row former is provided with a series of spaced protrusions or abutments on a front surface of the arm. The protrusions or abutments are positioned and dimensioned to fill the gaps formed between the side walls and apexes of the containers in the last formed row of the staggered array. As the row former pushes subsequently formed rows of containers in the row former slots across the infeed conveyor and onto the accumulating table surface, the forwardmost arm pushes the previously formed array of containers across the accumulating table surface. The abutments on the forwardmost arm occupy the gaps adjacent the apexes of the last formed row of containers in the array and push the apexes of the containers in the last formed row while the front surface of the forwardmost arm engages against and pushes the side walls of the containers in the last formed row. In this way, the forwardmost row former arm pushes the staggered array of containers across the accumulating table surface while maintaining the staggered arrangement of the containers in the array.

To move the two dimensional staggered array of containers formed by the row former further across the accumulating table surface, a modified array rake is provided. The modified rake is similar to prior art accumulating table rakes except that it is also provided with a series of abutments that project from a front surface of the rake. The abutments are arranged on the rake front surface to coincide with the positions of the gaps adjacent the apexes in the last formed row of containers in the array of containers. Like the abutments on the forwardmost row former arm, the abutments on the array rake occupy the gaps adjacent the apexes of the containers in the last formed row of containers of the array and push against the apexes while the front surface of the rake engages and pushes against the side walls of the containers in the last formed row of the array. In this way, the array rake pushes the staggered array of containers across the surface of the accumulating table while maintaining the staggered arrangement of the containers in the array. The rake also has protruding abutments on its rear surface should it be necessary to move a container array across the accumulating table surface back toward the row former.

To transfer a formed two dimensional staggered array of the containers as a layer onto a pallet of containers, a modified sweep mechanism is also provided. The modified sweep mechanism is similar to prior art sweep mechanisms in that it is basically comprised of front and rear panels and two side panels that pivot downwardly clasping around the four sides of the container array to sweep the array to a palletizer. However, the sweep mechanism of the invention differs from prior art sweep mechanisms in that the front and rear opposed panels of the mechanism that fold down and engage with the forwardmost row of containers and the rearwardmost row of containers in the staggered two dimensional array have abutments that occupy the gaps adjacent the apexes of the containers in the forwardmost and rearwardmost array rows. The abutments on the panels engage with the apexes of the containers in the forwardmost and rearwardmost rows of the array as the opposed surfaces of the front and rear panels engage with the side walls of the containers in the forwardmost and rearwardmost rows of the array. In this way the sweep mechanism maintains the two dimensional array of containers in its staggered configuration as the array is swept as a layer from the accumulating table surface to a pallet being formed with stacks of containers by a palletizer.

With the modifications to the conveyor system described above, the conveyor system of the invention is capable of forming rows of objects having triangular cross sections into two dimensional arrays of the objects and then conveying the two dimensional arrays to a palletizer where the layers of objects can be stacked onto a pallet while maintaining the staggered relationship of the objects throughout the conveyor system.

BRIEF DESCRIPTION OF THE DRAWINGS

Further features of the invention are set forth in the following detailed description of the preferred embodiment of the invention and in the drawing FIGS. wherein:

FIG. 1 is a side elevation view of a container having a triangular cross section of the type conveyed by the conveyor system of the invention;

FIG. 2 is a schematic plan view of containers with triangular cross sections arranged in a two dimensional array;

FIG. 3 is a schematic plan view of containers with triangular cross sections arranged in the novel staggered array of containers employed by the conveying system of the invention;

DETAILED DESCRIPTION OF THE PREFERRED EMBODIMENTS

The conveying system of the invention employs a row former communicating with an infeed conveyor, an accumulating table with an array rake and a palletizing sweep mechanism that have all been modified to form rows of objects having irregular shaped cross sections and to form the rows of objects into two dimensional arrays of staggered rows of the objects to stabilize the objects relative to each other as they are moved through the conveyor system. In the preferred embodiment of the conveyor system, the irregular shaped cross section objects being formed into rows by the row former and arranged into staggered two dimensional arrays are containers having triangular shaped cross sections, however the conveyor system of the invention may also be employed in arranging rows and staggered arrays of objects having other irregular shaped cross sections.

The conveyor system of the invention provides novel improvements to a row former, an accumulating table array rake, and a sweep mechanism that enables the conveyor system to form staggered rows of containers having triangular shaped cross sections, to arrange the rows into staggered arrays of the containers on the accumulating table, to move the staggered arrays of containers across the accumulating table surface with the array rake and to remove the staggered arrays of containers from the accumulating table surface with the modified sweep mechanism. Because row formers, accumulating tables and sweep mechanisms are known in the prior art, the constructions of these component parts of the invention that are part of the prior art will only be described in general terms, with the detailed description of the invention being devoted to the novel features of the invention that modify the row former, accumulating table array rake and the sweep mechanism.

Figure 4:
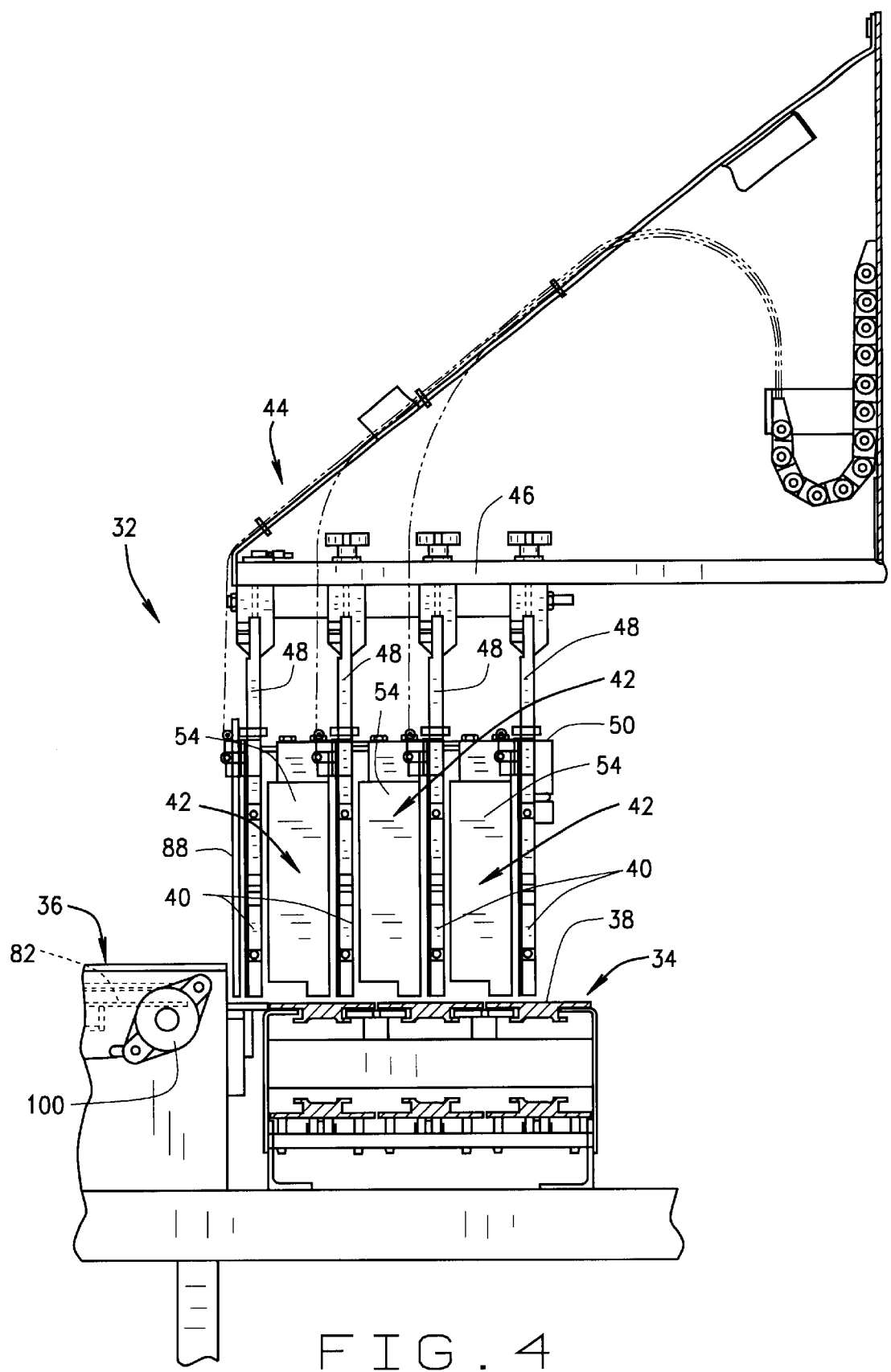
FIG. 4 is a side elevation view of the near end of the row former and a portion of the accumulating table.
Figure 5:
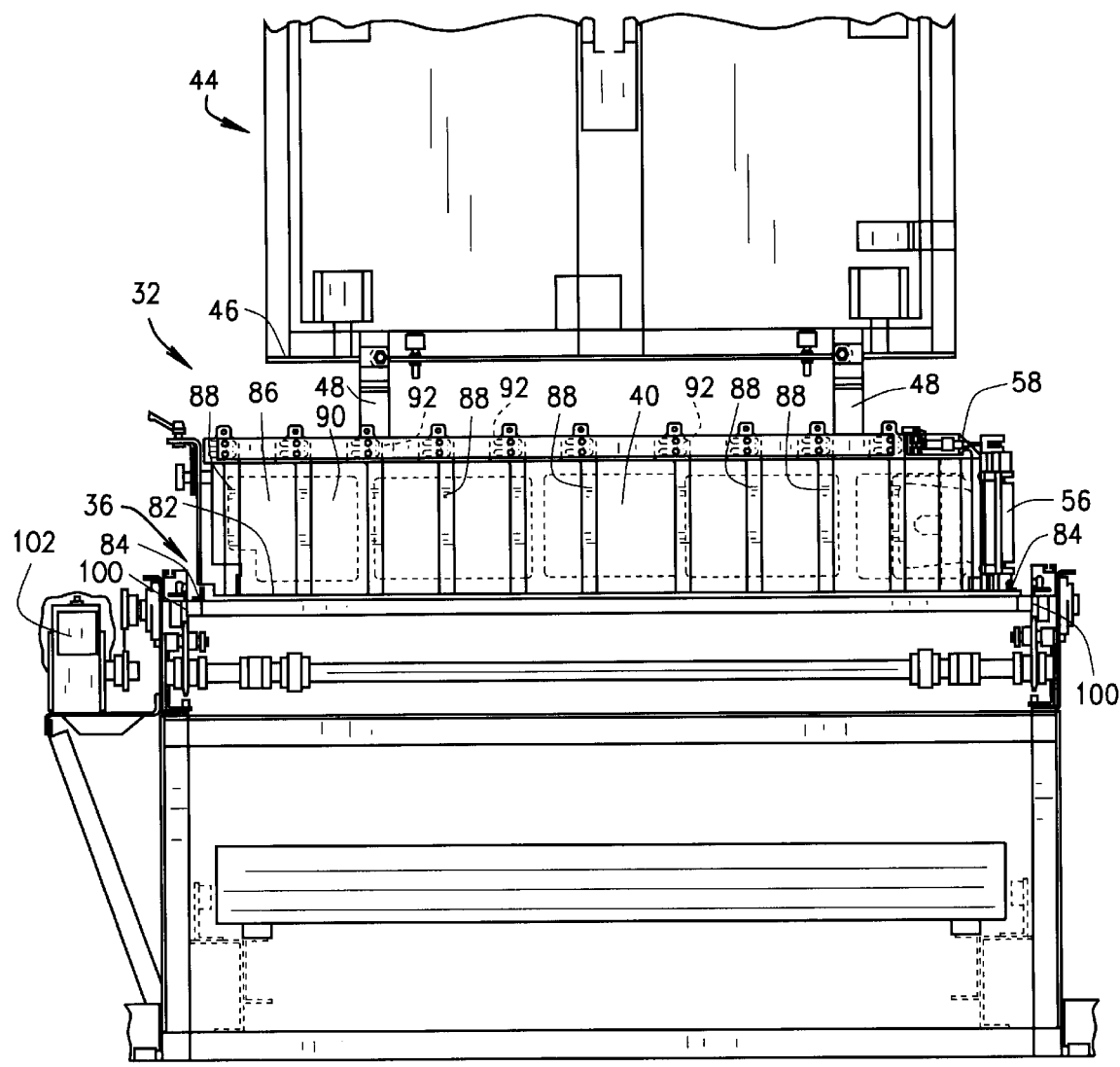
FIG. 5 is a front elevation view of the row former and the accumulating table.
Figure 6:
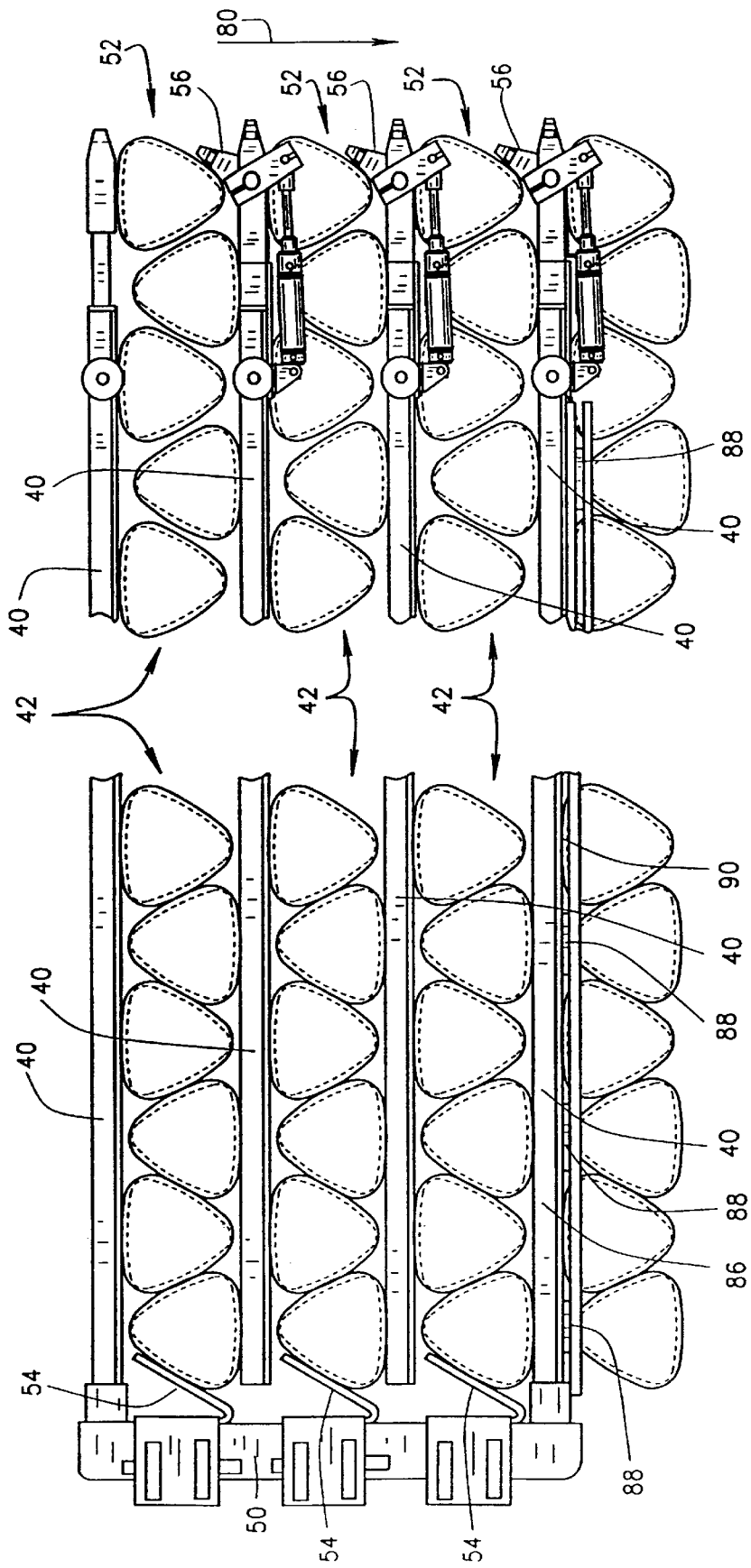
FIG. 6 is a segmented plan view of a portion of the row former.

A side elevation view of the row former 32 is shown in FIG. 4 and a front elevation view of the row former is shown in FIG. 5. In FIG. 4 the row former 32 is shown suspended above a portion of the infeed conveyor 34 and adjacent to a portion of the accumulating table 36. The accumulating table 36 is also shown in FIG. 5. FIG. 6 is a segmented plan view of a portion of the row former. In the illustrated embodiment of the invention, the row former 32 is fed with three streams of containers from the infeed conveyor 34. Referring to FIG. 4, the three streams of containers are supported on the conveying surface 38 of the infeed conveyor which is part of a belt type conveyor that conveys the three streams of containers along three channels or conveyor paths defined along the conveying surface 38 of the conveyor. Infeed conveyors of this type are known, and therefore the conveyor has not been described in detail or shown in detail in the drawing figures.

The row former 32 includes pairs of narrow, elongate arms 40. Each of the arms is basically a narrow panel that extends longitudinally over the infeed conveyor 34 and adjacent to the accumulating table 36. The arms are positioned parallel to each other with lateral spacings between opposed pairs of the arms that define longitudinal slots 42 extending between the arms. The lateral width dimension of the spacing between the pairs of adjacent row former arms 40 is slightly larger than the width of the containers measured between the apex 18 and the side wall 20 of a container. The difference in the width dimension of the container and the lateral width of the slots 42 is substantially equal to the dimension of the gap 24 between the side walls and apexes of containers arranged in each staggered row of the array of FIG. 3.

The arms are suspended above the infeed conveyor 34 by a support frame 44. Each arm 40 is connected to a base 46 of the frame by pairs of downwardly extending legs 48 that connect with the arms and suspend the arms from the frame base above the infeed conveyor. The support frame base 46 is connected to a first drive mechanism (not shown) that is operated to move the frame and the arms 40 together as a unit horizontally to the left as shown in FIG. 4 across the infeed conveyor 34 and the accumulating table 36. A second drive mechanism (not shown) then moves the arms vertically upwardly away from the accumulating table 46. The first drive mechanism then moves the frame horizontally to the right as shown in FIG. 4 and the second drive mechanism then moves the frame vertically downward toward the infeed conveyor 34 to the original positions of the arms 40 relative to the infeed conveyor shown in FIG. 4.

At the far ends of the slots 42 between opposed pairs of arms 40, the slots are closed by an end wall 50 that is attached to the forwardmost of the arms 40 shown to the left in FIG. 4 and the rearwardmost of the arms 40 shown to the right in FIG. 4. The end wall 50 connecting the ends of the forward and rearward arms, together with the legs 48 of the frame, secure the arms in their relative, parallel positions with the longitudinal slots 42 between the arms and with the arms positioned slightly above the conveying surface 38 of the infeed conveyor. The near ends of the slots 42 opposite the end wall 50 have receiving openings 52 that are positioned to receive streams of objects conveyed by the infeed conveyor 34. The row former shown is constructed to receive three rows of the containers 10 from the infeed conveyor 34. However, the row former could be constructed to receive more than the rows shown, or less than the rows shown.

The description of the row former 32 to this point is for the most part conventional except for the lateral spacing between adjacent arms 40 that is slightly larger than the width dimension of the containers 10 to establish the gaps 24 between the container apexes and adjacent arms 40 described earlier. In addition, a novel angled bracket 54 is secured to the end wall 50 of the row former at the far end of each of the slots 42. As seen in FIG. 4, the angled brackets 54 extend the vertical height of the slots 42 to engage along the lengths of the containers 10 that occupy the far ends of the slots when the rows of containers are fed into the slots 42 by the infeed conveyor 34. With the cross sections of the containers 10 being equilateral triangles with a 60 degree angle between adjacent side walls 20 of the containers, the angled bracket 54 projects outwardly from the row former end wall 50 at an angle of 30 degrees from the end wall 50. As best seen in FIG. 6, the brackets 54 engage with the side walls 20 of the containers at the ends of the rows fed into the slots and properly position the end containers with the side walls 20 of the containers engaging against one of the arms 40 of each opposed pair of arms and with the apexes 18 of the containers spaced the gap distance 24 from the opposite arm of the opposed pairs of arms. As subsequent containers are conveyed into the slots 42 and engage with the end containers that have been positioned in the slots by their contact with the brackets 54, the angled side walls 20 of the containers cause the subsequently conveyed containers to occupy the relative positions shown in FIG. 6. In this manner, the angled brackets 54, along with the spacing between the row former arms 40, function to establish the desired staggered arrangement of containers 10 in the rows of containers formed in the row former slots 42. In addition, each of the row former slots 42 is provided with a row retaining gate 56 mounted on each of the row former arms 40 at the receiving openings 52 of the slots.

Figure 7:
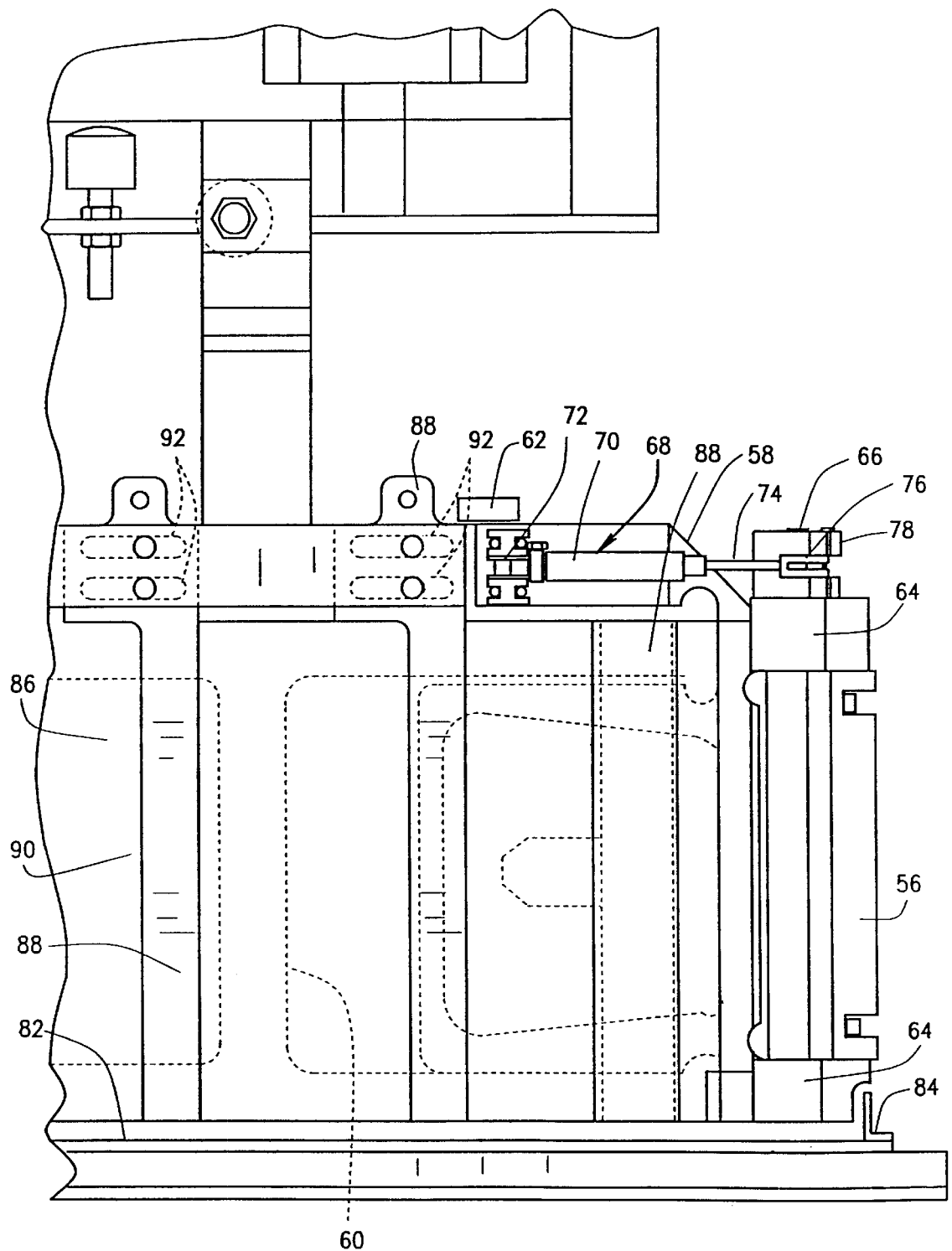
FIG. 7 is an enlarged front elevation view of a portion of the row former.

The row retaining gates 56 as shown in FIG. 7 are supported on panels 58 that are received in sliding engagement in recesses 60 at the ends of the row former arms 40. The sliding engagement of the panels 58 in the recesses enables the longitudinal adjustment of the length of the arms 40 by sliding the panels 58 outwardly from the recesses 60 and inwardly into the recesses. A screw threaded knob 62 is mounted through the tops of the row former arms 40 adjacent the panels 58 and is tightened down to hold the panels 58 in their adjusted positions relative to the ends of the arms 40.

Figure 8:
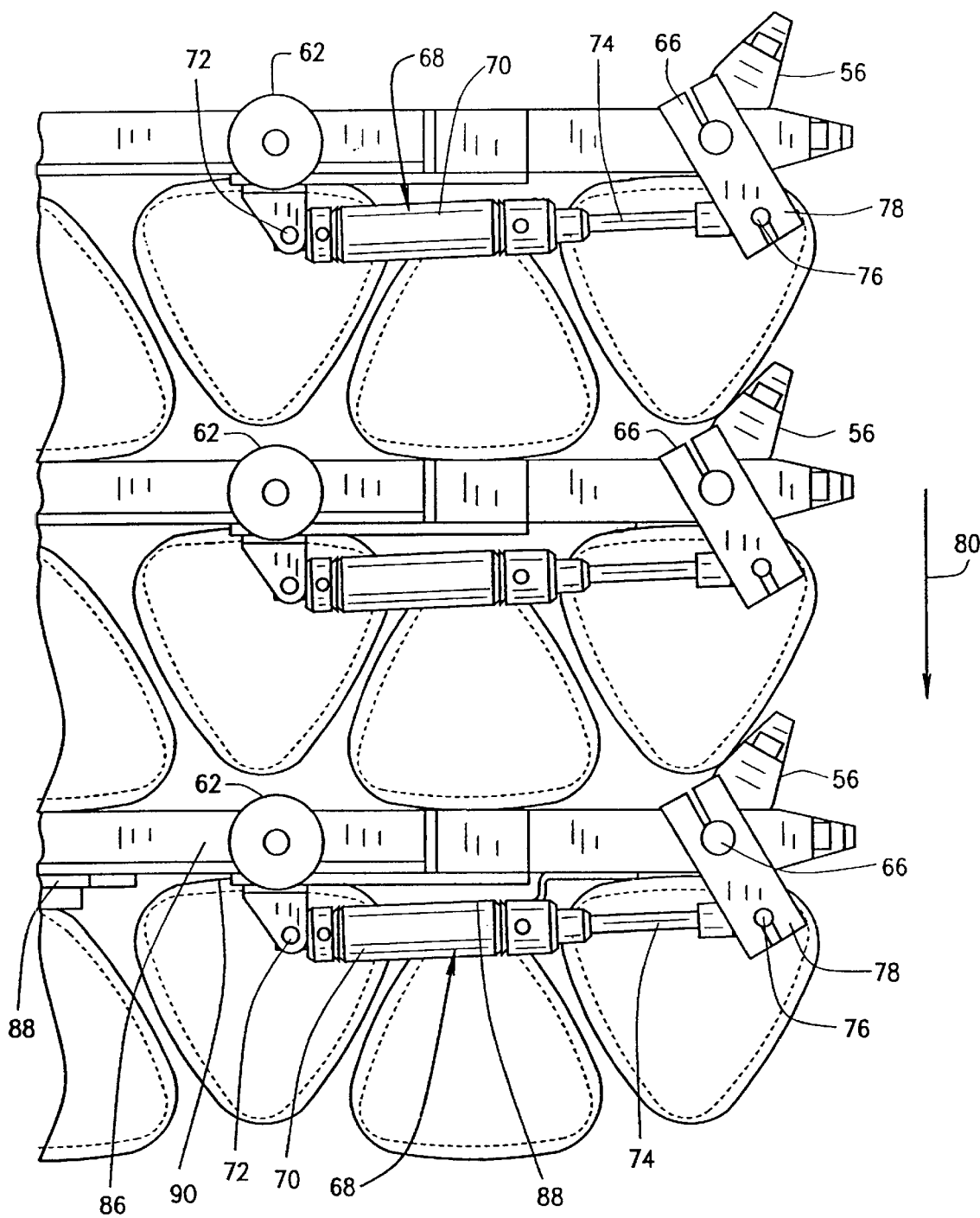
FIG. 8 is an enlarged plan view of a portion of the row former.

Each of the panels 58 has a pair of vertically spaced bearing blocks 64 mounted to the panels. The bearing blocks 64 support vertical gate shafts 66 at opposite ends of the shafts. The gates 56 are mounted to the shafts 66 for movement of the gates between opened positions where they project longitudinally outwardly from the ends of the arms 40 as shown in FIG. 8, and closed positions where the gates 56 project at an angle outwardly from the ends of the arms 40 and into the slots 42 as shown in FIG. 8. Movement of the gates between their opened and closed positions is controlled by double acting pneumatic actuators 68.

The actuators 68 have cylinder housings 70 that are mounted at one of their ends by pivot connections 72 to upper portions of the panels 58. Piston rods 74 project from the opposite ends of the actuator cylinders 70. The piston rods are connected by pivot connections 76 to crank arms 78 that are mounted to the tops of the gate shafts 66. A selective supply of pneumatic pressure to opposite ends of the actuator cylinders 70 causes the piston rods 74 to be either extended from the cylinders or retracted into the cylinders. The connection of the piston rods 74 to the gate shafts 66 through the crank arms 78 causes the gates 56 to be moved to their opened positions when the piston rods 74 are retracted into their cylinders 70 and to be moved to their closed positions when the piston rods 74 are extended from their cylinders 70.

In their opened positions, the gates 56 extend parallel with the row former arms 40 and provide clear access to the slots through the receiving openings 52 at the near ends of the slots. When moved to their closed positions, the gates 56 are oriented at an oblique angle relative to the row former arms 40. In the preferred embodiment, the oblique angle of the gates in their closed positions is 60 degrees, matching the angle between the side walls 20 of the containers 10. This positioning of the gates 56 in the closed positions causes the gates to engage against the side walls 20 of the end containers 10 at the ends of staggered rows of containers delivered to the slots 42 of the row former as shown in FIG. 8. Like the angle configuration of the brackets 54 at the opposite ends of the slots, the angled positioning of the closed gates 56 at the near ends of the slots pushes the end containers 10 at the near ends away from the gates causing the side walls 20 of the containers to engage against one of the row former arms 40, thus establishing the desired gaps 24 between the apexes 18 of the end containers 10 and the opposite arms 40 of the pair of arms. This positioning of the end containers at the near ends of the slots 42 by the angled orientation of the closed gates 56 also functions to establish the staggered configurations of the containers 10 in the rows formed in the row former 32 shown in FIG. 6. As seen in FIG. 6, the angled brackets 54 and the angled closed gates 56 function together to establish the staggered configurations of adjacent containers in the rows formed in each of the row former slots 42. In addition, as the row former 32 is moved laterally toward the accumulating table 36 in moving the formed rows of containers in the row former slots 42 from the infeed conveyor surface 38, the triangular cross sections of the containers would tend to move the containers longitudinally away from each other out of their staggered arrangement and into relative positions such as those shown in FIG. 2. The engagement of the angled brackets 54 and the angled gates 56 at the opposite ends of each of the staggered rows of containers in the slots 42 holds the containers in their staggered rows as the row former moves laterally from the infeed conveyor 34 to the accumulating table 36.

In operation of the row former 32, gates (not shown) of the infeed conveyor 34 adjacent the row former slot openings 52 would be opened, allowing the infeed conveyor to supply streams of the containers 10 in relative positions such as that shown in FIG. 2 into the row former slots 42. The lateral spacing between adjacent row former arms 40, in combination with the angled brackets 54 at the ends of the slots would cause the containers formed in rows in the slots to assume the staggered positions of the containers in the rows shown in FIG. 6. When a sufficient number of containers is supplied by the infeed conveyor 34 to each of the slots, the hold back gates of the infeed conveyor are closed and the row retainer gates 56 of the row former are also subsequently closed, holding the staggered rows of containers in their positions shown in FIG. 6. The row former 32 is then moved to the left as shown in FIG. 4, pushing the staggered rows of containers in the row former slots 42 off of the infeed conveyor surface 38 and onto the table surface 82 of the accumulating table 36 in the direction indicated by the arrow 80 shown in FIGS. 3, 6 and 8. The accumulating table surface has guide rails 84 extending along opposite sides of the table surface that hold the staggered rows in the arrangement as their rows are moved across the table surface.

With the first formed staggered rows of containers moved to the accumulating table surface 82, the row former gates 56 are opened and the drive mechanism of the row former would then cause the arms 40 to move vertically upward from the row accumulating table surface 82, leaving the staggered rows of containers on the table surface. The drive mechanism would then move the row former frame 46 to the right as shown in FIG. 4 to the positions of the arms in line with the infeed conveyor 34, and then move the arms vertically downward to their positions just above the infeed conveyor as shown in FIG. 4. The gates of the infeed conveyor would then be opened to supply numbers of containers into the row former slots 42 and the movement of the row former 32 described above would be repeated to move the next formed rows of containers onto the accumulating table surface 82.

As the row former 32 moves across the accumulating table surface 82 with the subsequent formed rows of containers, the forwardmost arm 86 of the row former engages against the staggered rows of containers previously moved onto the accumulating table surface 82 and pushes these rows of containers across the table surface. As the previously formed staggered rows of containers are pushed across the table surface 82 by the forwardmost row former arm 86, engagement of the containers at the ends of the staggered rows with the side guide rails 84 of the accumulating table prevents the rows of containers from spreading out or lengthening as they are pushed across the table surface, thereby maintaining the rows in their staggered arrangement. In addition, the forwardmost arm 86 of the row former is provided with a plurality of protrusions 88 that are secured to the arm in positions where the protrusions 88 will occupy the gaps 24 adjacent the apexes 18 of the staggered row of containers pushed by the forwardmost arm 86. The side walls 20 of the containers adjacent the containers making apex contact with the protrusions 88 contact the front surface 90 of the forwardmost arm between the protrusions. In this manner, the side guiderails 84 of the accumulating table surface and the protrusions 88 on the front surface of the forwardmost row former arm 86 function together to maintain the staggered arrangement of the rows of containers pushed across the accumulating table surface 82. As shown in FIG. 7, each of the protrusions 88 extend upwardly across the vertical height of the forwardmost arm 86 and is provided with pairs of oblong slots 92. Threaded fasteners are inserted through the slots 92 and attach the protrusions 88 to the forwardmost arms 86. The oblong slots enable the protrusions 88 to be adjustably positioned side to side on the front surface 90 of the forwardmost arm 86.

Figure 9:
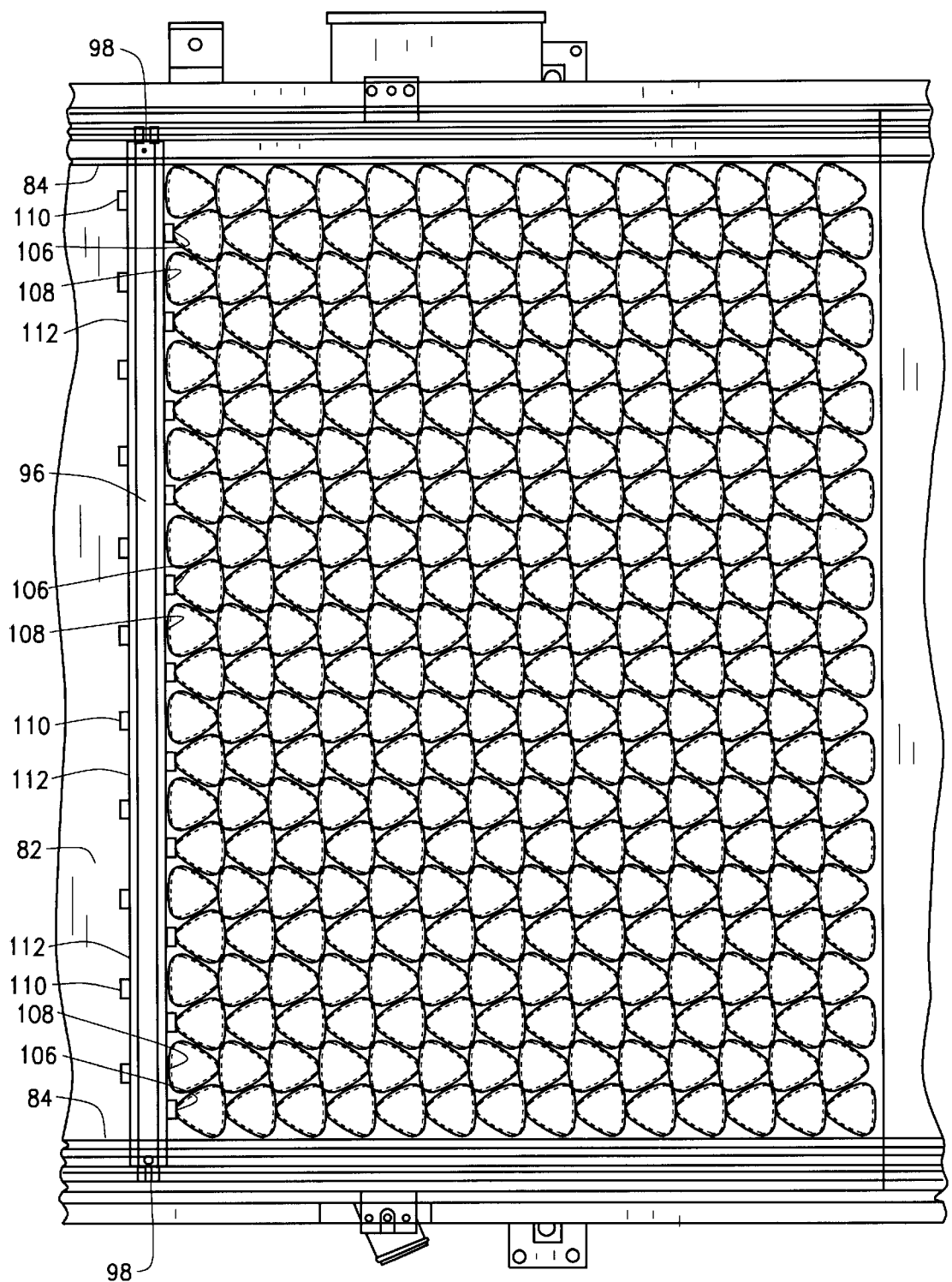
FIG. 9 is a plan view of the array rake and a portion of the accumulating table.

FIG. 9 shows a top view of a portion of the accumulating table surface 82 with a two dimensional array of containers 10 arranged in the preferred staggered arrangement on the table surface 82. Also shown in FIG. 9 is the novel array rake 96. The rake 96 extends completely across the accumulating table surface 82 and has chain links 98 pivotally connected to its opposite ends. The chain links 98 are parts of two chain belts (not shown) that extend the length of the accumulating table 36 and are looped around sprockets 100 at opposite ends of the table. The pairs of sprockets 100 positioned on opposite sides of the accumulating table surface 82 at the opposite ends of the table are interconnected by shafts and are driven by a motive source 102 to cause the array rake 96 to move across the accumulating table surface 82 from left to right as viewed in FIG. 9. At the end of its movement across the top of the accumulating table surface 82, the array rake 96 passes around the pair of sprockets at the end of the table and is returned beneath the accumulating table surface 82 to a position of the rake adjacent the row former 32 where it travels around the pair of sprockets of the chain drive adjacent the row former and again returns to its position over the accumulating table surface 82. The motive source 102 of the array rake chain drive is timed so that each time the array rake 96 is moved to its position above the accumulating table surface 82 as it moves across the table surface, it will engage with a two dimensional array of the containers that has been previously arranged on the table surface by the row former 32 and move the array across the table surface.

The array rake, the chain drive system and its method of operation described above are for the most part conventional. However, the array rake 96 of the invention is provided with a plurality of protrusions 106 on a front surface 108 of the rake. As seen in FIG. 9, the plurality of protrusions 106 are spacially arranged across the rake front surface 108 where they will occupy the gaps 24 in the staggered row of containers pushed by the rake with the protrusions 106 pushing against the apexes 18 of the containers in the pushed row. The rake front surface 108 pushes against the side walls 20 of the containers in the pushed row. In this manner, the array rake 96 of the invention pushes the two dimensional array of containers 10 shown in FIG. 9 across the accumulating table surface 82 while, together with the accumulating table surface guide rails 84, maintaining the staggered arrangement of the container array. The array rake also has a plurality of protrusions 110 projecting from the rear surface 112 of the rake. These protrusions 110, like the protrusions 106 on the front surface of the rake, are provided to maintain the staggered relationship of containers in the array should it be desired to push the array of containers back toward the row former 32 by reversing the motive source 102 of the array rake. Because the gaps in the pushed rows of the two dimensional array on opposite sides of the array are not aligned, the rear protrusions 110 are positioned between the front protrusions 106 of the array.

Figure 10:
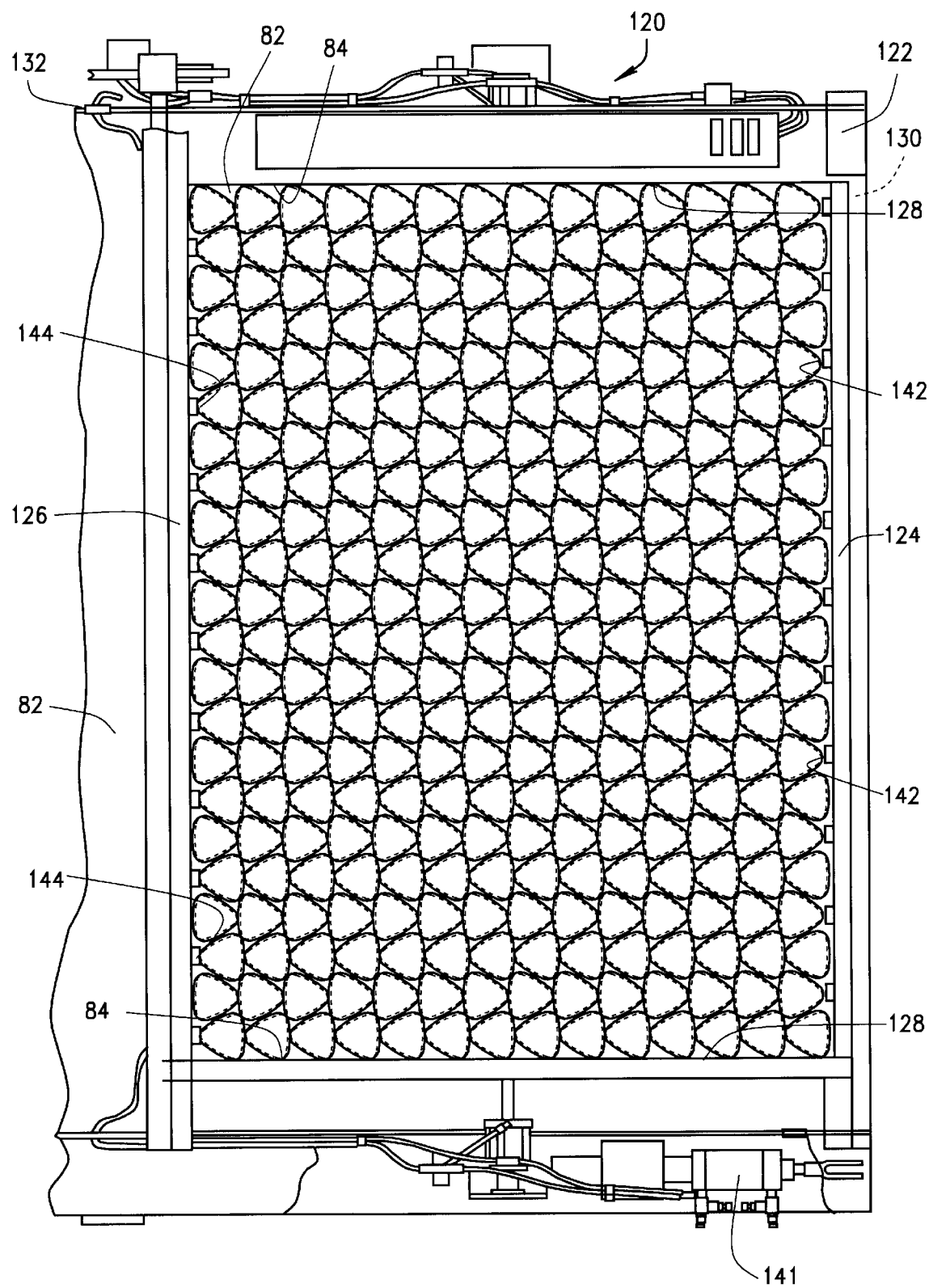
FIG. 10 is a plan view of the sweep mechanism and a portion of the accumulating table.
Figure 11:
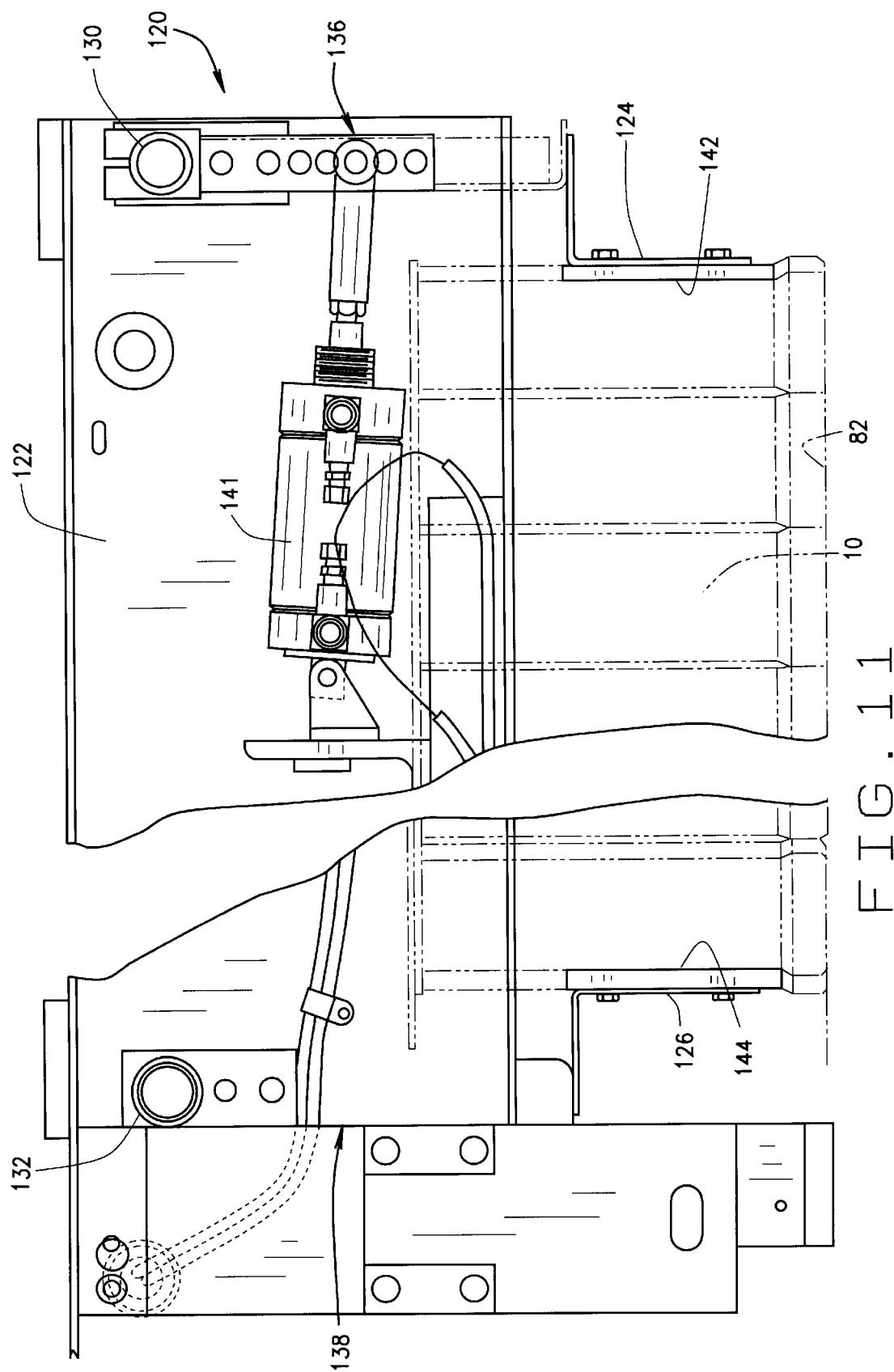
FIG. 11 is a partial side elevation view of the sweep mechanism.
Figure 12:
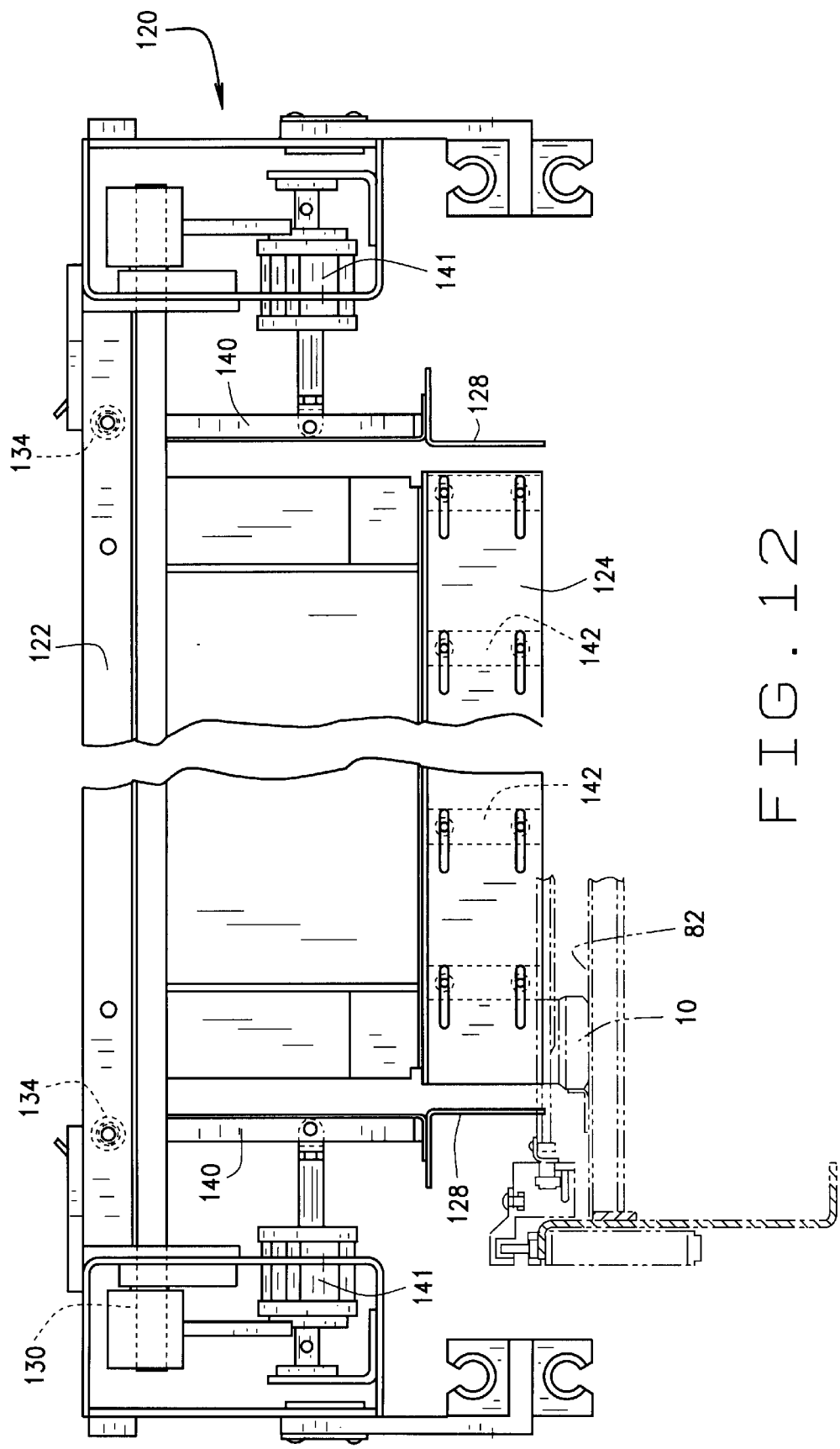
FIG. 12 is a partial end elevation view of the sweep mechanism and a portion of the accumulating table.

FIG. 10 shows a top view of the conveyor sweep mechanism 120 clamped around a two dimensional array of the containers in their staggered arrangement. The sweep mechanism 120 is similar in construction to prior art sweep mechanisms in that it is constructed with a rectangular frame 122 and four panels including a front 124 and rear 126 panel as well as two side panels 128. The sweep mechanism frame 122 is supported by a drive mechanism (not shown) of the conveyor system that selectively moves the frame vertically toward and away from the accumulating table surface 82 and horizontally over the accumulating table surface toward and away from the row former 32. The four panels 124, 126, 128 are suspended from the frame 122 by respective pivot rods 130, 132, 134 and brackets 136, 138, 140 associated with each of the panels. Pneumatic actuators 141 are connected between the sweep mechanism frame 122 and each of the brackets 136, 138, 140 and are selectively actuated to move the panels 124, 126, 128 between their downwardly suspended positions shown in FIGS. 10–12 where the four panels engage against the four sides of the staggered array of containers, and outwardly pivoted positions of the panels where they are positioned clear of the sides of the container array for positioning of the panels around the array or removing the panels from around the array. The four panels 124, 126, 128 are pivoted to their downwardly suspended positions with the frame 122 positioned just above the container array as shown in FIG. 10 when the sweep mechanism 120 is employed to sweep the array as a layer of objects to be stacked on a pallet by a palletizer (not shown).

The construction of the sweep mechanism 120 described above is, for the most part, conventional. However, the sweep mechanism of the invention has been modified in that pluralities of protrusions 142, 144 have been secured to the opposed surfaces of the front panel 124 and rear panel 126, respectively. As seem in FIG. 10 with the panels moved to their downwardly suspended positions around the array, the protrusions 142, 144 occupy the gaps 24 adjacent the apexes 18 of the staggered rows of containers in the front row and rear row of the two dimensional array of containers. The protrusions 142, 144 engage with the apexes 18 of the containers in the front and rear rows of the array and the opposed surfaces of the front panel 124 and rear panel 126 engage with the side walls 20 of the containers in the front row and rear row of the array. The side panels 128 engage with the apexes 18 of the containers at the ends of the rows on opposite sides of the array. This engagement of the protrusions 142, 144 and the four panels 124, 126, 128 along the perimeter of the container array as shown in FIG. 10 maintains the staggered arrangement of the containers in each row of the array as the entire array is swept by the sweep mechanism 120 from the accumulating table surface 82 to deliver a layer on a pallet being stacked with layers of the containers by a palletizer (not shown). In this manner, the sweep mechanism 120 maintains the staggered arrangement of the containers in the array as it sweeps layers of the containers to a palletizer.

While the present invention has been described by reference to a specific embodiment, it should be understood that modifications and variations of the invention may be constructed without departing form the scope of the invention defined in the following claims.

What is claimed:

1. A row former that is moved vertically and horizontally relative to a row forming plane of a conveyor to form rows of objects conveyed by the conveyor on the row forming plane, the row former comprising:

at least one pair of laterally spaced arms defining a longitudinal row forming slot between the arms, the slot between the one pair of arms being laterally dimensioned to receive only one longitudinally extending row of objects between the one pair of arms, the slot having a closed end and an opened end; and an angled surface in the slot at the closed end of the slot.

2. The row former of claim 1, wherein:

the pair of arms are parallel to each other and the angled surface is oriented at an oblique angle relative to the arms.

3. The row former of claim 1, wherein:

the pair of arms is one pair of a plurality of pairs of arms forming a plurality of slots between the arms, and the angled surface is one angled surface of a plurality of angled surfaces that are each positioned in a slot of the plurality of slots.

4. The row former of claim 3, wherein:

each angled surface of the plurality of angled surfaces is oriented at an equal angle relative to the plurality of arms.

5. The row former of claim 1, wherein:

the angled surface is on a bracket at the closed end of the slot.

6. A row former that is moved vertically and horizontally relative to a row forming plane of a conveyor to form rows of objects conveyed by the conveyor on the row forming plane, the row former comprising:

at least one pair of laterally spaced arms defining a longitudinal row forming slot between the arms, the slot having a closed end and an opened end;

an angled surface in the slot at the closed end of the slot;

a gate is mounted on one arm of the pair of arms and is movable between an opened position where the gate projects in a direction that is parallel with the one arm and a closed position where the gate projects into the slot in a direction that is angled relative to the one arm.

7. A row former that is moved vertically and horizontally relative to a row forming plane of a conveyor to form rows of objects conveyed by the conveyor on the row forming plane, the row former comprising:

at least one pair of laterally spaced arms defining a longitudinal row forming slot between the arms, the slot having a closed end and an opened end;

an angled surface in the slot at the closed end of the slot; and, a plurality of protrusions project from one arm of the pair of arms and are equally, spatially positioned along the one arm.

8. A row former that is moved vertically and horizontally relative to the row forming plane of a conveyor to form rows of objects conveyed by the conveyor on the row forming plane, the row former comprising:

at least one pair of laterally spaced arms defining a longitudinal row forming slot between the arms, the slot having a closed end and an opened end;

an angled surface in the slot at the closed end of the slot; and, an infeed conveyor is positioned beneath the row former where the infeed conveyor can supply objects to the slot through the open end of the slot.

9. A row former that is moved vertically and horizontally relative to a row forming plane of a conveyor to form rows of objects conveyed by the conveyor on the row forming plane, the row former comprising:

at least one pair of laterally spaced arms defining a longitudinal row forming slot between the arms, the slot having a closed end and an opened end;

an angled surface in the slot at the closed end of the slot; and the row former forms rows of objects having triangular cross-sections with width dimensions between apexes and opposite side walls of the objects, and the pair of laterally spaced arms are spaced by a lateral dimension that is larger than the object width dimension.

10. A row former that is moved vertically and horizontally relative to a row forming plane of a conveyor to form rows of objects conveyed by the conveyor on the row forming plane, the row former comprising:

at least one pair of laterally spaced arms defining a longitudinal row forming slot between the arms, the slot having a closed end and an opened end;

an angled surface in the slot at the closed end of the slot; and, an accumulating table is positioned laterally adjacent the pair of arms, the table has a surface and the pair of arms are movable laterally over the table surface, and a pair of laterally extending guide rails are positioned on longitudinally opposite sides of the table surface.

11. The row former of claim 10, wherein:

an array rake is mounted on the accumulating table surface for lateral movement of the rake across the surface, the array rake extends longitudinally across the surface and has a plurality of protrusions that project from the array rake over the table surface and are spatially positioned along the array rake.

12. A row former that is moved vertically and horizontally relative to a row forming plane of a conveyor to form rows of objects conveyed by the conveyor on the row forming plane, the row former comprising:

at least one pair of laterally spaced arms defining a longitudinal row forming slot between the arms, the slot having a closed end and an opened end;

an angled surface in the slot at the closed end of the slot;

an accumulating table positioned laterally adjacent the pair of arms, the table has a surface and the pair of arms are movable laterally over the table surface, and a pair of laterally extending guide rails are positioned on longitudinally opposite sides of the table surface;

an array rake is mounted on the accumulating table surface for lateral movement of the rake across the surface, the array rake extends longitudinally across the surface and has a plurality of protrusions that project from the array rake over the table surface and are spatially positioned along the array rake; and, the array rake has a front surface on an opposite side of the array rake from the row former arms and the plurality of protrusions project from the front surface.

13. The row former of claim 12, wherein:

the array rake has a rear surface on an opposite side of the array rake from the front surface and the plurality of protrusions also project from the rear surface.

14. The row former of claim 13, wherein:

the plurality of protrusions on the front surface and the rear surface of the array rake are not laterally opposite each other.

15. The row former of claim 12, wherein:

a plurality of protrusions project from one arm of the pair of arms and the protrusions on the one arm and the protrusions on the array rake are equally, spatially positioned along the one arm and the array rake.

16. A row former that is moved vertically and horizontally relative to a row forming plane of a conveyor to form rows of objects conveyed by the conveyor on the row forming plane, the row former comprising:

at least one pair of laterally spaced arms defining a longitudinal row forming slot between the arms, the slot having a closed end and an opened end;

an angled surface in the slot at the closed end of the slot;

an accumulating table is positioned laterally adjacent the pair of arms, the table has a surface and the pair of arms are movable laterally over the table surface, and a pair of laterally extending guide rails are positioned on longitudinally opposite sides of the table surface; and, a sweep mechanism is positioned adjacent the accumulating table surface for movement of the sweep mechanism relative to the table surface, the sweep mechanism has a pair of longitudinally spaced side panels that extend downwardly on opposite sides of the table surface and a front panel and rear panel that extend across the table surface, and the front panel and rear panel have respective front protrusions and rear protrusions that project toward each other.

17. The row former of claim 16, wherein:

the front protrusions and rear protrusions are not laterally opposite each other.

18. The row former of claim 16, wherein:

the front panel and rear panel have surfaces that oppose each other and the front protrusions and the rear protrusions are on the surfaces of the front panel and rear panel that oppose each other.

19. An accumulating table for forming rows of objects on the table into an array of the objects and moving the array of objects across the table, the accumulating table comprising:

a surface and a pair of laterally extending guide rails on longitudinally opposite sides of the surface;

an array rake mounted on the accumulating table for lateral movement of the rake across the table surface, the rake extending longitudinally across the table surface; and a plurality of protrusions projecting from the array rake over the table surface, the plurality of protrusions being spatially arranged along the array rake.

20. The accumulating table of claim 19, wherein:

the array rake has opposite front and rear surfaces and the plurality of protrusions project from the front surface.

21. An accumulating table for forming rows of objects on the table into an array of objects and moving the array of objects across the table, the accumulating table comprising:

a surface and a pair of laterally extending guide rails on longitudinally opposite sides of the surface;

an array rake mounted on the accumulating table for lateral movement of the rake across the table surface, the rake extending longitudinally across the table surface;

the array rake has opposite front and rear surfaces and the plurality of protrusions project from the front surface; and, the plurality of protrusions also project from the rear surface of the rake.

22. The accumulating table of claim 21, wherein:

the plurality of protrusions on the front surface and rear surface of the array rake are not laterally opposite each other.

23. An accumulating table for forming rows of objects on the table into an array of objects and moving the array of objects across the table, the accumulating table comprising:

an surface and a pair of laterally extending guide rails on longitudinally opposite sides of the surface;

an array rake mounted on the accumulating table for lateral movement of the rake across the table surface, the rake extending longitudinally across the table surface; and, a sweep mechanism is positioned adjacent the accumulating table surface for movement of the sweep mechanism relative to the table surface, the sweep mechanism has a pair of longitudinally spaced side panels that extend downwardly on opposite sides of the table surface and a front panel and rear panel that extend across the table surface, and the front panel and rear panel have respective front protrusions and rear protrusions that project toward each other.

24. The accumulating table of claim 23, wherein:

the front protrusions and rear protrusions are not laterally opposite each other.

25. The accumulating table of claim 23, wherein:

the front panel and rear panel have surfaces that oppose each other and the front protrusions and the rear protrusions are one the surfaces of the front panel and rear panel that oppose each other.

26. An accumulating table for forming rows of objects on the table into an array of the objects and moving the array of objects across the table, the accumulating table comprising:

a surface and a pair of laterally extending guide rails on longitudinally opposite sides of the surface;

a sweep mechanism positioned adjacent the accumulating table surface for movement of the sweep mechanism across the table surface, the sweep mechanism having a pair of longitudinally spaced side panels that extend downwardly on opposite sides of the table surface and a front panel and a rear panel that extend longitudinally across the table surface, and the front panel and the rear panel have respective front protrusions and rear protrusions that project outwardly from the front and rear panels toward each other.

27. The accumulating table of claim 26, wherein:

the front protrusions and rear protrusions are not laterally opposite each other.

28. The accumulating table of claim 26, wherein:

the front panel and rear panel have surfaces that oppose each other and the front protrusions and the rear protrusions are on the surfaces of the front panel and rear panel that oppose each other.

* * * * *